(12) United States Patent
Araoka

(10) Patent No.: US 9,154,719 B2
(45) Date of Patent: Oct. 6, 2015

(54) IMAGE SENSOR, IMAGING SYSTEM, SENSOR, AND OPERATION METHOD FOR IMAGE SENSOR

(71) Applicant: CANON KABUSHIKI KAISHA, Tokyo (JP)

(72) Inventor: Yukio Araoka, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,141

(22) Filed: Jun. 25, 2014

(65) Prior Publication Data

US 2015/0009371 A1    Jan. 8, 2015

(30) Foreign Application Priority Data

Jul. 3, 2013    (JP) .................................. 2013-140196
May 16, 2014  (JP) .................................. 2014-102732

(51) Int. Cl.
*H04N 5/378* (2011.01)
*H04N 5/365* (2011.01)
*H04N 5/376* (2011.01)
*H04N 5/357* (2011.01)

(52) U.S. Cl.
CPC ............... *H04N 5/378* (2013.01); *H04N 5/357* (2013.01); *H04N 5/3658* (2013.01); *H04N 5/3765* (2013.01)

(58) Field of Classification Search
CPC ..... H04N 5/3765; H04N 5/376; H04N 5/369; H04N 5/37213; H04N 5/374; H04N 5/3742; H04N 5/378; H04N 5/357
See application file for complete search history.

(56) References Cited

U.S. PATENT DOCUMENTS

| 7,593,050 | B2 | 9/2009 | Xu | |
| 7,864,242 | B2 * | 1/2011 | Namai et al. | 348/367 |
| 8,199,233 | B2 * | 6/2012 | Shoyama | 348/296 |
| 8,947,568 | B2 * | 2/2015 | Egawa | 348/296 |
| 2005/0007460 | A1 * | 1/2005 | Stavely et al. | 348/222.1 |
| 2008/0291304 | A1 | 11/2008 | Ota et al. | |
| 2011/0058080 | A1 * | 3/2011 | Egawa | 348/296 |

FOREIGN PATENT DOCUMENTS

| EP | 1850582 A1 | 10/2007 |
| EP | 1903776 A2 | 3/2008 |

(Continued)

OTHER PUBLICATIONS

Dec. 1, 2014 extended European Search Report in corresponding to foreign counterpart European Patent Application No. 14172276.9.

*Primary Examiner* — Nicholas Giles
(74) *Attorney, Agent, or Firm* — Fitzpatrick, Cella, Harper & Scinto

(57) ABSTRACT

An image sensor has a pixel array, a readout portion configured to read out a signal from the pixel array, and a control portion which controls the readout portion. The readout portion includes a row selecting portion which selects a row in the pixel array, a column selecting portion which selects a column in the pixel array, and an output portion which outputs a signal from a pixel, of pixels on a row selected by the row selecting portion, which corresponds to a column selected by the column selecting portion. The pixel array includes blocks differing in distance from the output portion, and the control portion controls readout periods required by the readout portion to read out signals from the blocks so as to read out signals from blocks in longer readout periods as distances from the output portion increase.

18 Claims, 9 Drawing Sheets

(56) References Cited

FOREIGN PATENT DOCUMENTS

| | | |
|---|---|---|
| EP | 2059020 A2 | 5/2009 |
| JP | 2009-528721 A | 8/2009 |
| WO | 2007/100498 A1 | 9/2007 |

* cited by examiner

F I G. 2
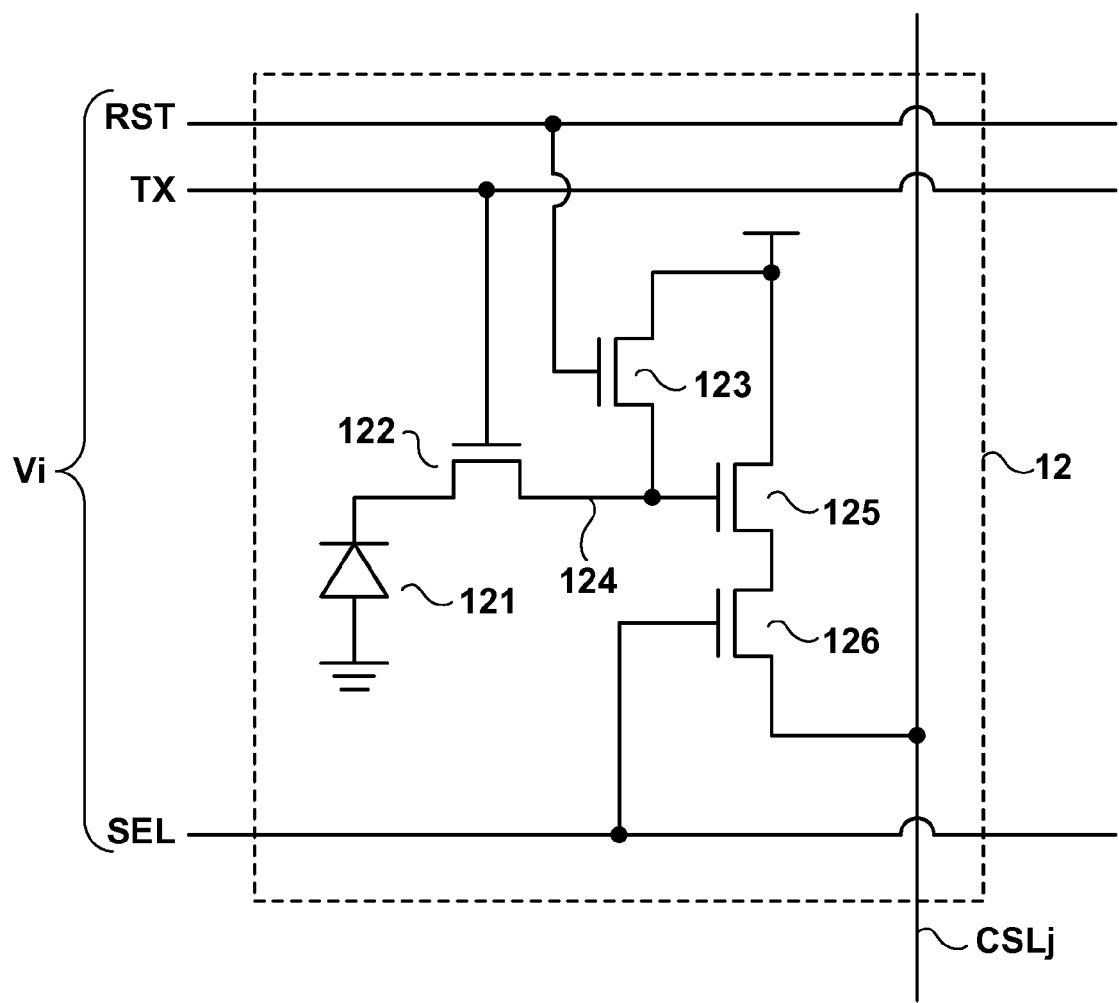

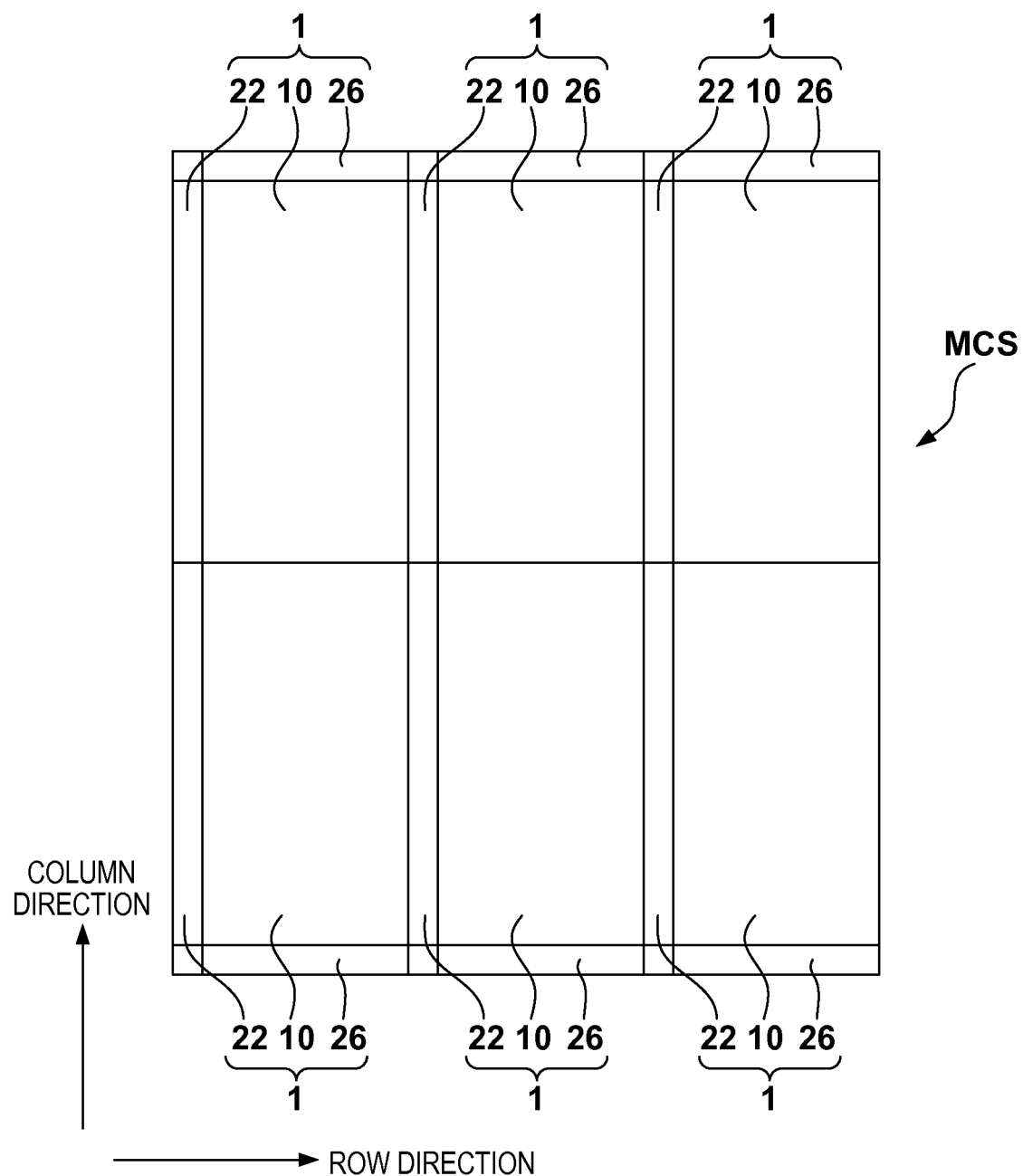

IMAGE SENSOR, IMAGING SYSTEM, SENSOR, AND OPERATION METHOD FOR IMAGE SENSOR

BACKGROUND OF THE INVENTION

1. Field of the Invention

The present invention relates to an image sensor, an imaging system, a sensor, and an operation method for the image sensor.

2. Description of the Related Art

In an image sensor, a row selecting circuit selects a row of a pixel array, and a plurality of pixels on the selected row output signals to a plurality of column signal lines. A column selecting circuit then outputs signals from the pixels on one row while sequentially selecting a plurality of column signal lines. The image sensor sequentially performs this operation for a plurality of rows while changing a row to be selected. In a conventional image sensor, a readout period for signals is constant regardless of any row selected from a plurality of rows of a pixel array.

However, in an image sensor including a pixel array and a horizontal output circuit which sequentially selects and outputs signals output from the pixel array to a plurality of column signal lines, a shortage of readout period can occur more with an increase in distance from the horizontal output circuit. Such a problem becomes more conspicuous in an image sensor with a large pixel array size of several tens of cm. Shortages of readout period corresponding to row positions can cause shading.

SUMMARY OF THE INVENTION

The present invention provides a technique advantageous to reduce shading due shortages of readout period corresponding to row positions.

A first aspect of the present invention provides an image sensor comprising: a pixel array in which a plurality of pixels are arranged so as to form a plurality of rows and a plurality of columns; a readout portion configured to read out a signal from the pixel array; and a control portion configured to control the readout portion, wherein the readout portion includes a row selecting portion configured to select a row in the pixel array, a column selecting portion configured to select a column in the pixel array, and an output portion configured to output a signal from a pixel, of pixels on a row selected by the row selecting portion, which corresponds to a column selected by the column selecting portion, wherein the pixel array includes a plurality of blocks differing in distance from the output portion, and wherein the control portion controls readout periods required by the readout portion to read out signals from the plurality of blocks so as to read out signals from blocks in longer readout periods as distances from the output portion increase.

A second aspect of the present invention provides an imaging system comprising: an image sensor as defined as the first aspect of the present invention; and a processing portion configured to process a signal output from the image sensor.

A third aspect of the present invention provides a sensor comprising an array of a plurality of image sensors as defined as the first aspect of the present invention.

A fourth aspect of the present invention provides an operation method for an image sensor including a pixel array in which a plurality of pixels are arranged so as to form a plurality of rows and a plurality of columns and a readout portion configured to read out a signal from the pixel array, wherein the readout portion includes a row selecting portion configured to select a row in the pixel array, a column selecting portion configured to select a column in the pixel array, and an output portion configured to output a signal from a pixel, of pixels on a row selected by the row selecting portion, which corresponds to a column selected by the column selecting portion, the pixel array includes a plurality of blocks differing in distance from the output portion, and wherein the operation method comprises controlling readout periods required by the readout portion to read out signals from the plurality of blocks so as to read out signals from blocks in longer readout periods as distances from the output portion increase.

Further features of the present invention will become apparent from the following description of exemplary embodiments with reference to the attached drawings.

BRIEF DESCRIPTION OF THE DRAWINGS

FIG. 2 is a circuit diagram showing an example of the arrangement of a pixel;

FIG. 8 is a view showing the arrangement of a multi-chip sensor according to one embodiment of the present invention.

DESCRIPTION OF THE EMBODIMENTS

An exemplary embodiment of the present invention will be described below with reference to the accompanying drawings.

Figure 1:
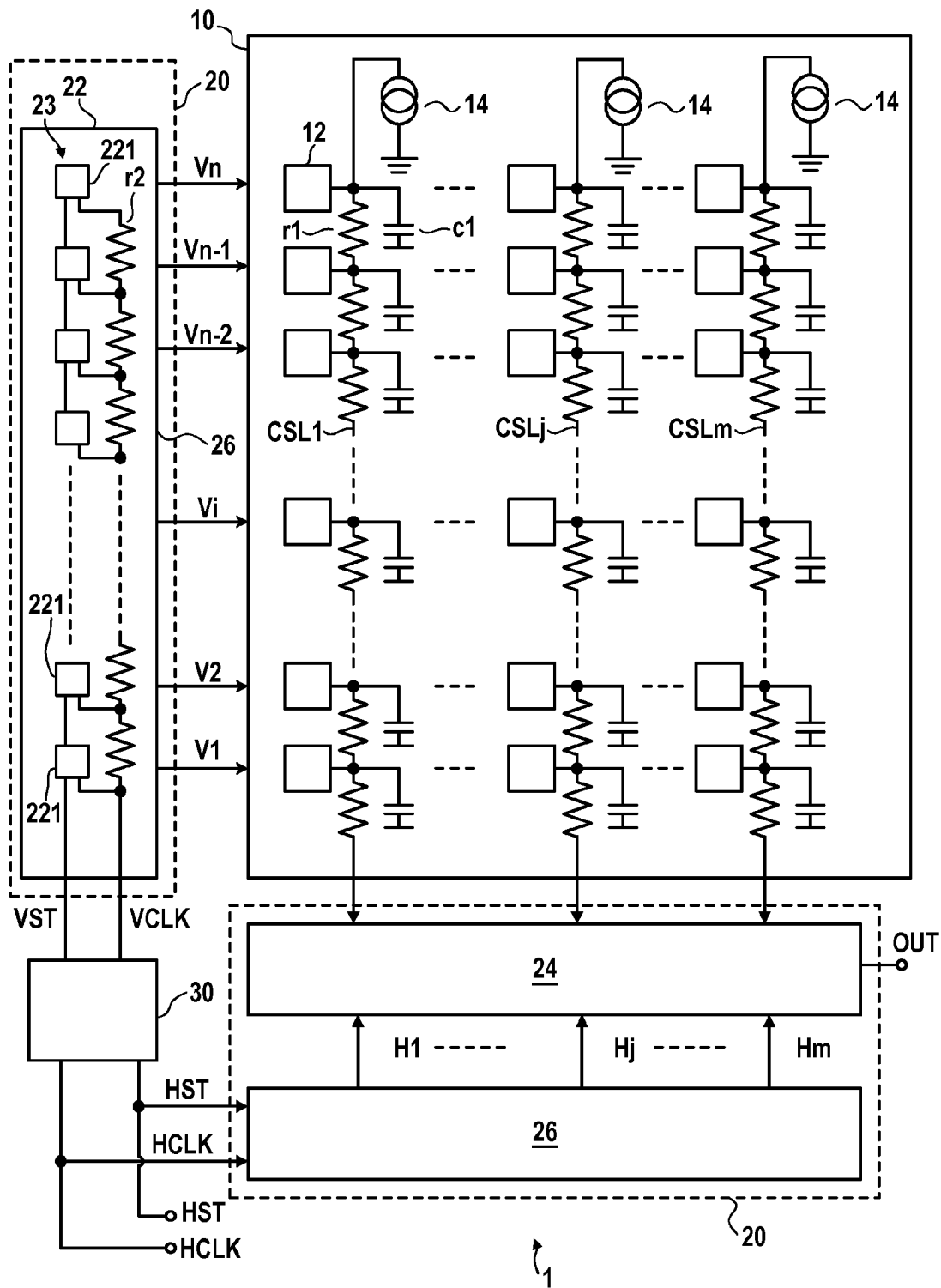
FIG. 1 is a circuit diagram showing the arrangement of an image sensor according to one embodiment of the present invention.

FIG. 1 shows the arrangement of an image sensor 1 according to one embodiment of the present invention. The image sensor 1 includes a pixel array 10 in which a plurality of pixels 12 are arranged to form a plurality of rows and a plurality of columns, a readout portion 20 which reads out signals from the pixel array 10, and a control portion 30 which controls the readout portion 20. The readout portion 20 can include a row selecting portion 22, an output portion 24, and a column selecting portion 26. The row selecting portion 22 selects a row in the pixel array 10. The column selecting portion 26 selects a column in the pixel array 10. The output portion 24 outputs a signal from the pixel 12, of the pixels 12 on the row selected by the row selecting portion 22, which corresponds to the column selected by the column selecting portion 26. All the elements constituting the image sensor 1 may be arranged on one substrate or all or some of elements, other than the pixel array 10, of a plurality of pixels forming the image sensor 1 may be arranged on a substrate different from the substrate on which the pixel array 10 is arranged.

Each pixel 12 of the pixel array 10 is controlled by a row control signal group Vi (assume that the pixel array 10 is formed by n rows, and i represents 1 to n) supplied from the row selecting portion 22. As described later, for example, the row control signal group Vi can include a transfer control signal TX, a reset control signal RST, and a selecting signal SEL. Signals from the pixels 12 on the column selected by the row selecting portion 22 are output to column signal lines CSLj (assume that the pixel array 10 is formed by m rows, and j represents 1 to m). The column signal line CSLj has a parasitic resistance r1 and a parasitic capacitance c1. Current sources 14 are connected to the column signal lines CSLj.

The row selecting portion 22 includes a vertical shift register 23 which shifts a vertical shift pulse in accordance with a vertical shift clock VCLK. The vertical shift register 23 can be formed by series-connecting a plurality of registers (for example, flip-flops) 221 which receive pulses from the preceding stage in synchronism with the vertical shift clocks VCLK. The vertical shift register 23 shifts a vertical shift pulse in accordance with the vertical shift clock VCLK in response to a vertical-shift start signal VST. The row selecting portion 22 selects a row corresponding to the position of a vertical shift pulse in the vertical shift register 23. The transfer path of the vertical shift clock VCLK has parasitic loads such as a parasitic resistance r2.

The column selecting portion 26 includes a horizontal shift register which starts shifting a horizontal shift pulse in accordance with a horizontal shift clock HCLK in response to a horizontal-shift start signal HST, and selects a column corresponding to the position of the horizontal shift pulse. The column selecting portion 26 selects a column by setting a corresponding column selecting signal Hj at active level.

The control portion 30 supplies the vertical shift clock VCLK and the vertical-shift start signal VST to the row selecting portion 22, and the horizontal shift clock HCLK and the horizontal-shift start signal HST to the column selecting portion 26. The image sensor 1 can include pads which respectively output the horizontal shift clock HCLK and the horizontal-shift start signal HST.

FIG. 2 exemplifies the arrangement of one pixel 12. The pixel 12 can include, for example, a photoelectric conversion portion (for example, photodiode) 121, a transfer transistor 122, a floating diffusion 124, a reset transistor 123, an amplification transistor 125, and a selecting transistor 126. The image sensor 1 may be formed as a radiation imaging apparatus which detects radiation. In this case, the pixel array 10 can include a scintillator which converts radiation into light. Alternatively, each photoelectric conversion portion 121 may be formed to directly convert radiation into charges.

The charges generated by photoelectric conversion in the photoelectric conversion portion 121 are accumulated in the charge accumulation area of the photoelectric conversion portion 121. When the transfer control signal TX goes to active level, the transfer transistor 122 transfers the charges accumulated in the charge accumulation area of the photoelectric conversion portion 121 to the floating diffusion 124. The amplification transistor 125 forms a source follower, together with the current source 14 connected to the column signal line CSLj, and outputs a signal corresponding to the electric potential of the floating diffusion 124 to the column signal line CSLj. When the reset control signal RST goes to active level, the reset transistor 123 resets the electric potential of the floating diffusion 124. When the selecting signal SEL goes to active level, the selecting transistor 126 connects the amplification transistor 125 to the column signal line CSLj. That the selecting signal SEL goes to active level indicates that the pixels on the row to which the selecting signal SEL is supplied are set in the selected state.

Figure 3:
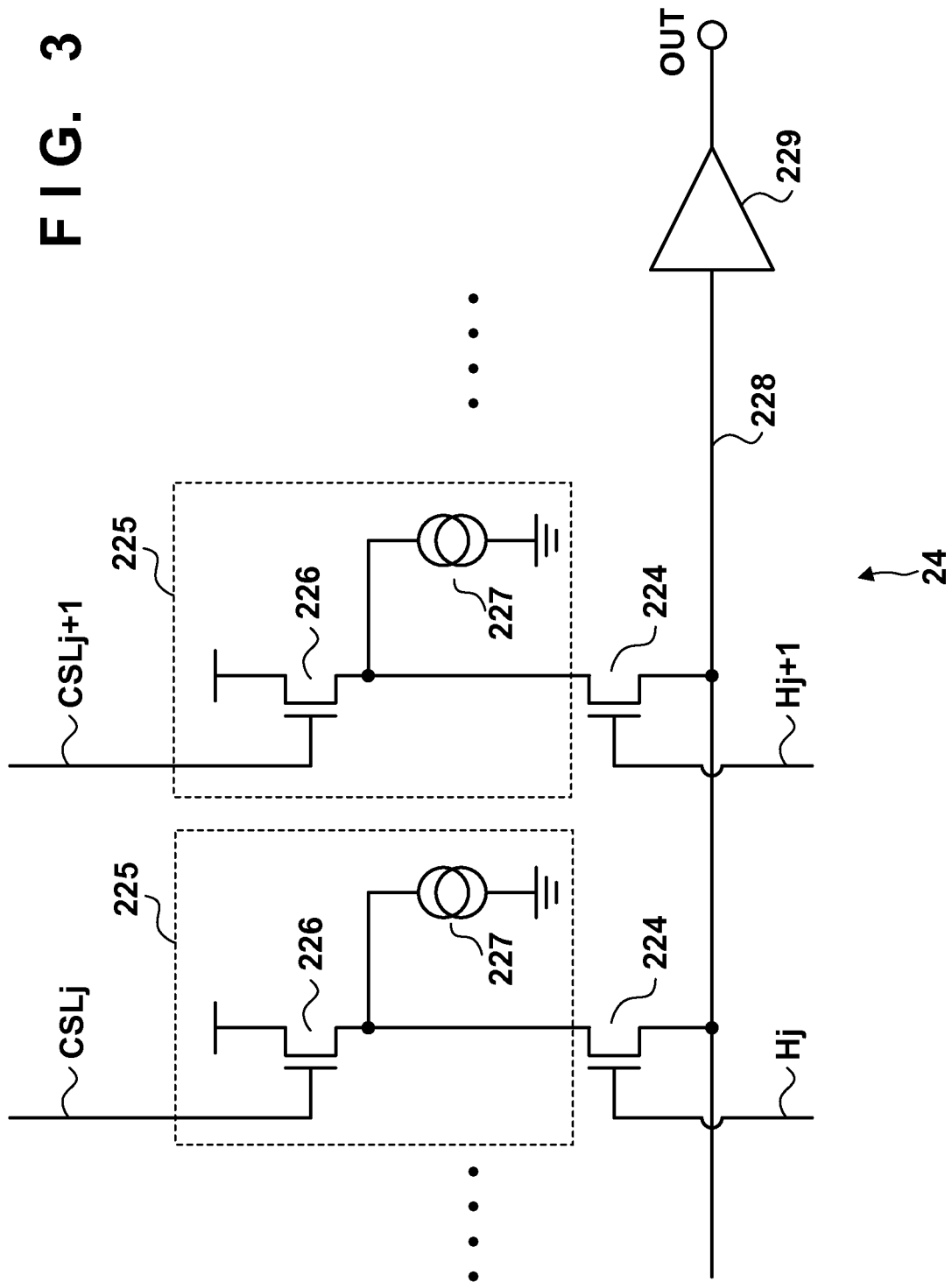
FIG. 3 is a circuit diagram showing an example of the arrangement of a readout portion.

FIG. 3 exemplifies the arrangement of the output portion 24. The output portion 24 includes, for example, a horizontal signal line 228 and a plurality of switches 224 each of which outputs a signal from the pixel 12, of the pixels 12 on the row selected by the row selecting portion 22, which corresponds to the column selected by the column selecting portion 26. The output portion 24 may also include an amplifier 229 which amplifies the signal output to the horizontal signal line 228. The output portion 24 may also include a processing circuit 225 which processes the signal output to the column signal line CSLj.

The processing circuit 225 can be, for example, a source follower circuit, sample/hold circuit, buffer circuit, or differential amplifier circuit. FIG. 3 shows a case in which the processing circuit 225 is a source follower circuit. In the case shown in FIG. 3, the processing circuit 225 includes a transistor 226 and a current source 227.

Figure 7:
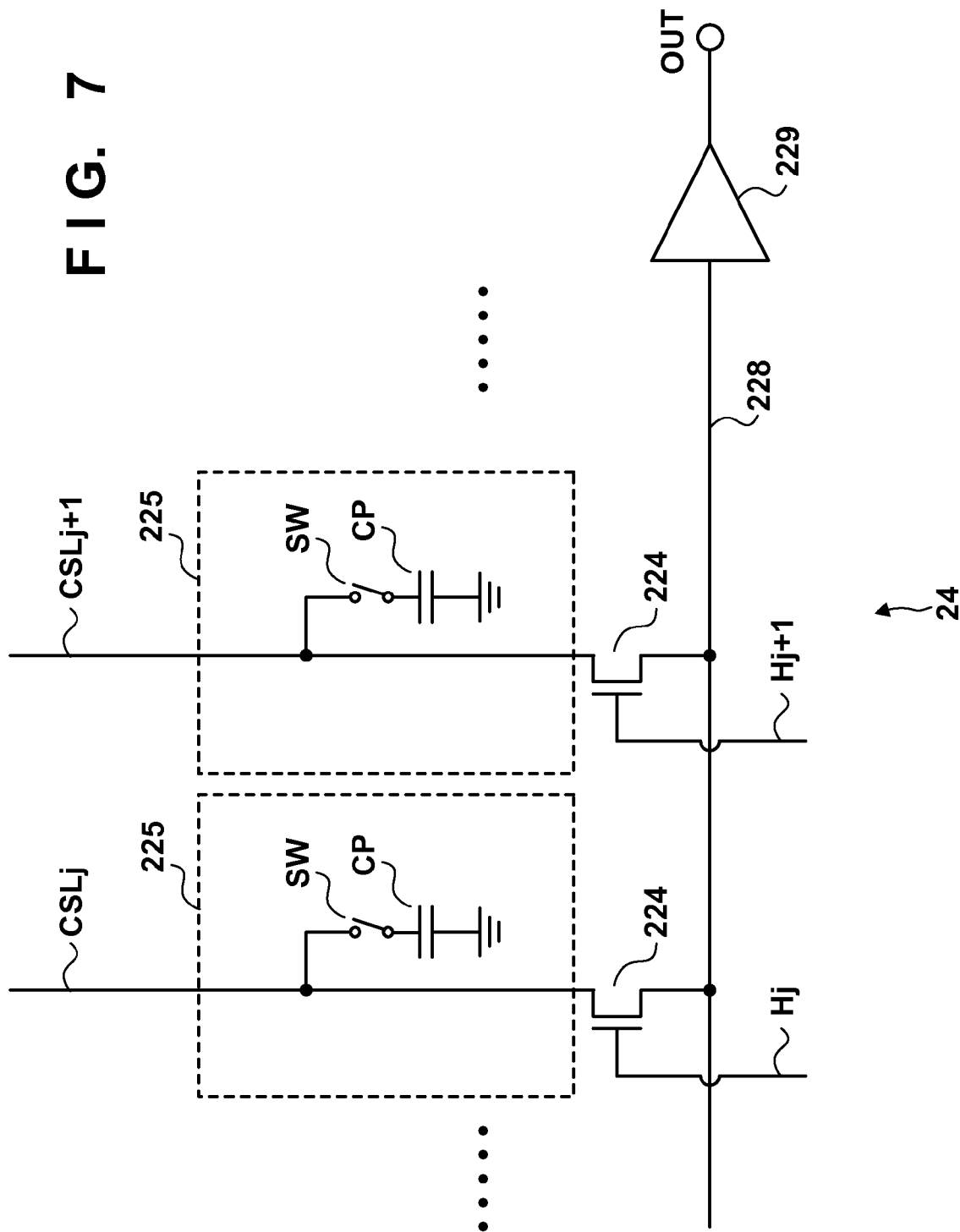
FIG. 7 is a circuit diagram showing another example of the arrangement of the readout portion.

FIG. 7 shows a case in which the processing circuit 225 is a sample/hold circuit. The sample/hold circuit includes the capacitive element CP for sampling/holding a signal output to the column signal line CSLj and the switch SW provided between the column signal line CSLj and the capacitive element CP. When the switch SW is turned on, the column signal line CSLj is connected to the capacitive element CP. A signal on the column signal line CSLj is written in the capacitive element CP. When the switch SW makes transition from an ON state to an OFF state, the signal which has been written in the capacitive element CP until the transition is made is held.

The output portion 24 may include a memory in addition to the processing circuit 225. If the memory is formed from a capacitive element, it is necessary to reset the electric potential of the horizontal signal line 228 after the capacitive element is connected to the horizontal signal line 228 via the switches 224 to output a signal.

As described above, a parasitic load such as the parasitic resistance r2 exists in the transfer path of the vertical shift clock VCLK in the vertical shift register 23 forming the row selecting portion 22. For this reason, the waveform of the vertical shift clock VCLK supplied to each of the registers 221 constituting the vertical shift register 23 is rounded in accordance with the distance from the control portion 30 as the supply source of the vertical shift clock VCLK. More specifically, the time required for one shift operation (the operation of shifting a pulse from one register 221 to the next register 221) increases in accordance with the distance. Therefore, the delay time from the transition timing of the vertical shift clock VCLK in the control portion 30 as the supply source of the vertical shift clock VCLK to the timing of the selection of a row increases in accordance with the distance. That is, the time which can be used for readout operation (that is, the readout period) decreases in accordance with the distance. The control portion 30 is placed nearer to the first-stage register 221 of the vertical shift register 23 than the last-stage register 221 of the vertical shift register 23.

The parasitic resistance r1 and the parasitic capacitance c1 exist in the column signal line CSLj. Therefore, the time required to transfer a signal from a pixel on a selected row to the output portion 24 increases in accordance with the distance from the row to the output portion 24. Such a problem becomes more conspicuous in an image sensor with a large pixel array size of several tens of cm. Shortages of readout period corresponding to row positions can cause shading.

In this embodiment, therefore, the pixel array 10 is divided into a plurality of blocks differing in distance from the output portion 24, and different readout periods are assigned to the plurality of blocks. More specifically, the control portion 30 controls readout periods during which the readout portion 20 reads out signals from the respective blocks such that the readout portion 20 reads out signals in longer readout periods from blocks with an increase in distance from the output portion 24. The following will describe an example in which the pixel array 10 is divided into three blocks, namely the first, second, and third blocks, in increasing order of distance from the output portion 24. Note that when the pixel array is divided into the largest number of blocks, each block is formed by one row. That is, each block is formed by at least one row.

Figure 4:
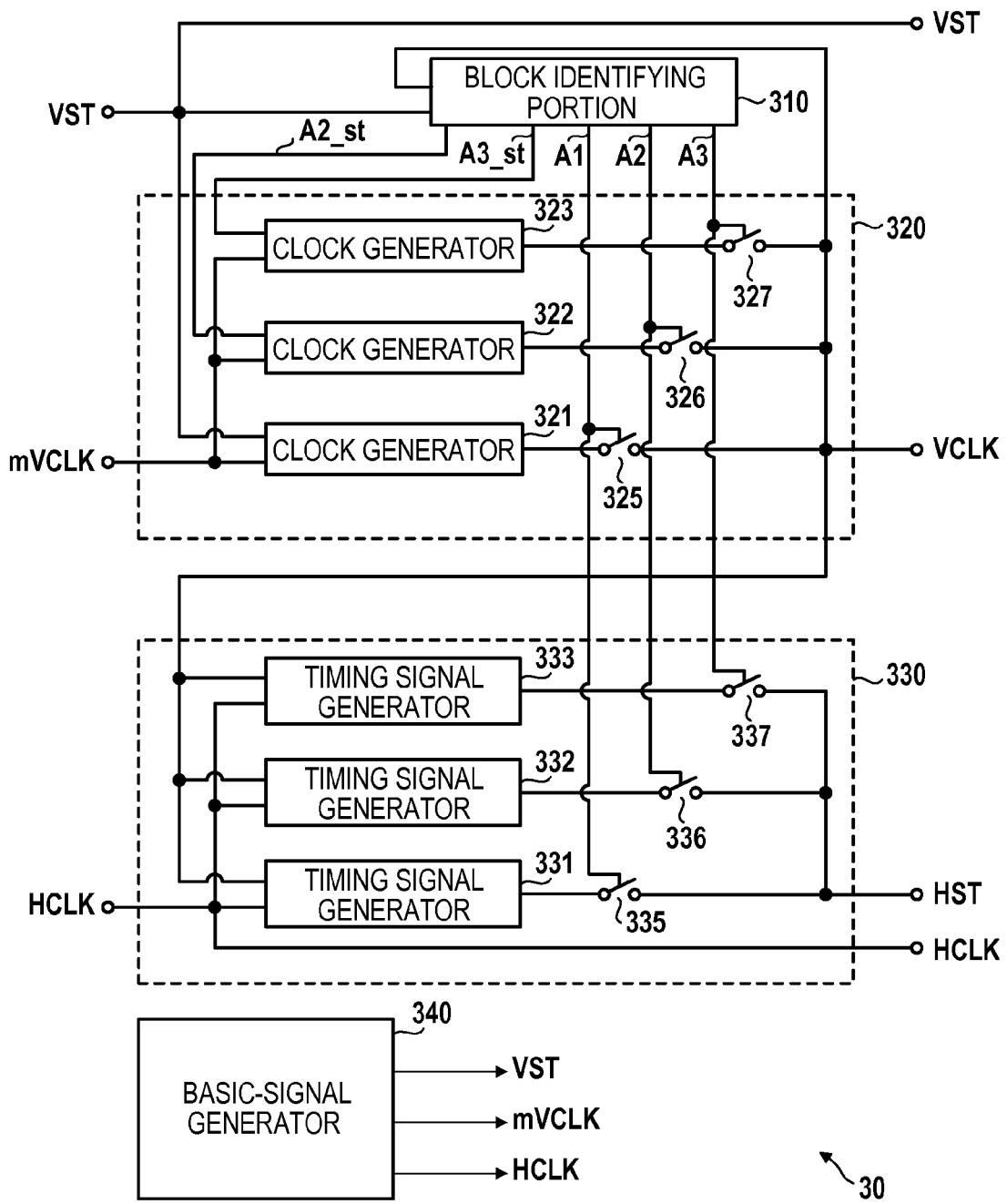
FIG. 4 is a block diagram showing an example of the arrangement of a control portion.

FIG. 4 exemplifies the arrangement of the control portion 30. The control portion 30 includes, for example, a block identifying portion 310, a vertical control portion 320, a horizontal control portion 330, and a basic-signal generator 340. The basic-signal generator 340 generates the vertical-shift start signal VST, a basic clock mVCLK, and the horizontal shift clock HCLK.

The block identifying portion 310 performs a counting operation in accordance with the vertical shift clocks VCLK in response to the vertical-shift start signal VST, and identifies a selected row in the pixel array 10 as a row belonging to a specific one of the plurality of blocks based on the count value. In this case, the count value coincides with the number of the row selected by the row selecting portion 22. If the row selected by the row selecting portion 22 belongs to the first block, the block identifying portion 310 sets a first block signal A1 at active level. Likewise, if the row selected by the row selecting portion 22 belongs to the second block, the block identifying portion 310 sets a second block signal A2 at active level. Likewise, if the row selected by the row selecting portion 22 belongs to the third block, the block identifying portion 310 sets a third block signal A3 at active level.

The vertical control portion 320 includes a plurality of clock generators 321, 322, and 323 which generate clocks of periods corresponding to the corresponding blocks of the plurality of blocks (first, second, and third blocks) of the pixel array 10. The clocks generated by the respective clock generators 321, 322, and 323 are selected by switches 325 to 327 respectively controlled by the first to third block signals A1 to A3, and output as the vertical shift clocks VCLK.

In this case, let VP1 be the period of the clock generated by the clock generator 321 corresponding to the first block. In addition, let VP2 be the period of the clock generated by the clock generator 322 corresponding to the second block. Furthermore, let VP3 be the period of the clock generated by the clock generator 323 corresponding to the third block. In this embodiment, in order to increase the row selection time required by the row selecting portion 22 for the blocks with an increase in distance from the output portion 24, the periods of the clocks respectively generated by the clock generators 321, 322, and 323 are determined to satisfy VP1<VP2<VP3. This increases the readout period required to read out a signal from a block with an increase in distance from the output portion 24. For example, it is possible to set VP1, VP2, and VP3 so as to satisfy VP2=VP1+$\alpha$ and VP3=VP1+2$\alpha$ where $\alpha$ is a positive number. For example, $\alpha$ can be on the order of ns.

The clock generator 321 can be formed to start generating a clock in response to, for example, the vertical-shift start signal VST generated by the basic-signal generator 340. On the other hand, the clock generators 322 and 323 can be formed to start generating clocks in response to clock generation start signals A2_st and A3_st respectively synchronized with the block identifying signals A2 and A3. Alternatively, the clock generators 321, 322, and 323 can be formed by, for example, a frequency dividing circuit which frequency-divides the basic clock VCLK generated by the basic-signal generator 340.

The horizontal control portion 330 includes a plurality of timing signal generators 331, 332, and 333 which generate timing signals corresponding to the corresponding blocks of the plurality of blocks (first, second, and third blocks). The signals generated by the timing signal generators 331, 332, and 333 are selected by switches 335 to 337 respectively controlled by the first to third block signals A1 to A3, and output as the horizontal-shift start signals HST.

In this case, let t1 be the time of occurrence of a timing signal generated by the timing signal generator 331 corresponding to the first block, t2 be the time of occurrence of a timing signal generated by the timing signal generator 332 corresponding to the second block, and t3 be the time of occurrence of a timing signal generated by the timing signal generator 333 corresponding to the third block. In this embodiment, the timing signal generators 331, 332, and 333 are formed to increase the time from the selection of a row by the row selecting portion 22 to the generation of the horizontal-shift start signal HST for a corresponding block with an increase in distance from the output portion 24. In other words, the timing signal generators 331, 332, and 333 are formed such that the time from the instant the row selecting portion 22 selects a row to the instant the output portion 24 starts outputting a signal from the first pixel on the row increases for the corresponding block with an increase in distance from the output portion 24. More specifically, the timing signal generators 331, 332, and 333 are formed such that t2 is later than t1, and t3 is later than t2. This makes the readout portion 20 read out a signal from a block in a longer readout period as the distance from the output portion 24 increases. For example, t1, t2, and t3 can be set to satisfy t2=t1+$\beta$ and t3=t1+2$\beta$ where $\beta$ is a positive number.

The timing signal generators 331, 332, and 333 can be formed from, for example, a counter which counts the horizontal shift clocks HCLK generated by the basic-signal generator 340. This counter can be formed to start counting in response to the vertical shift clock VCLK generated by the vertical control portion 320. Alternatively, the timing signal generators 331, 332, and 333 can be formed from other circuit elements such as delay elements.

Figure 5:
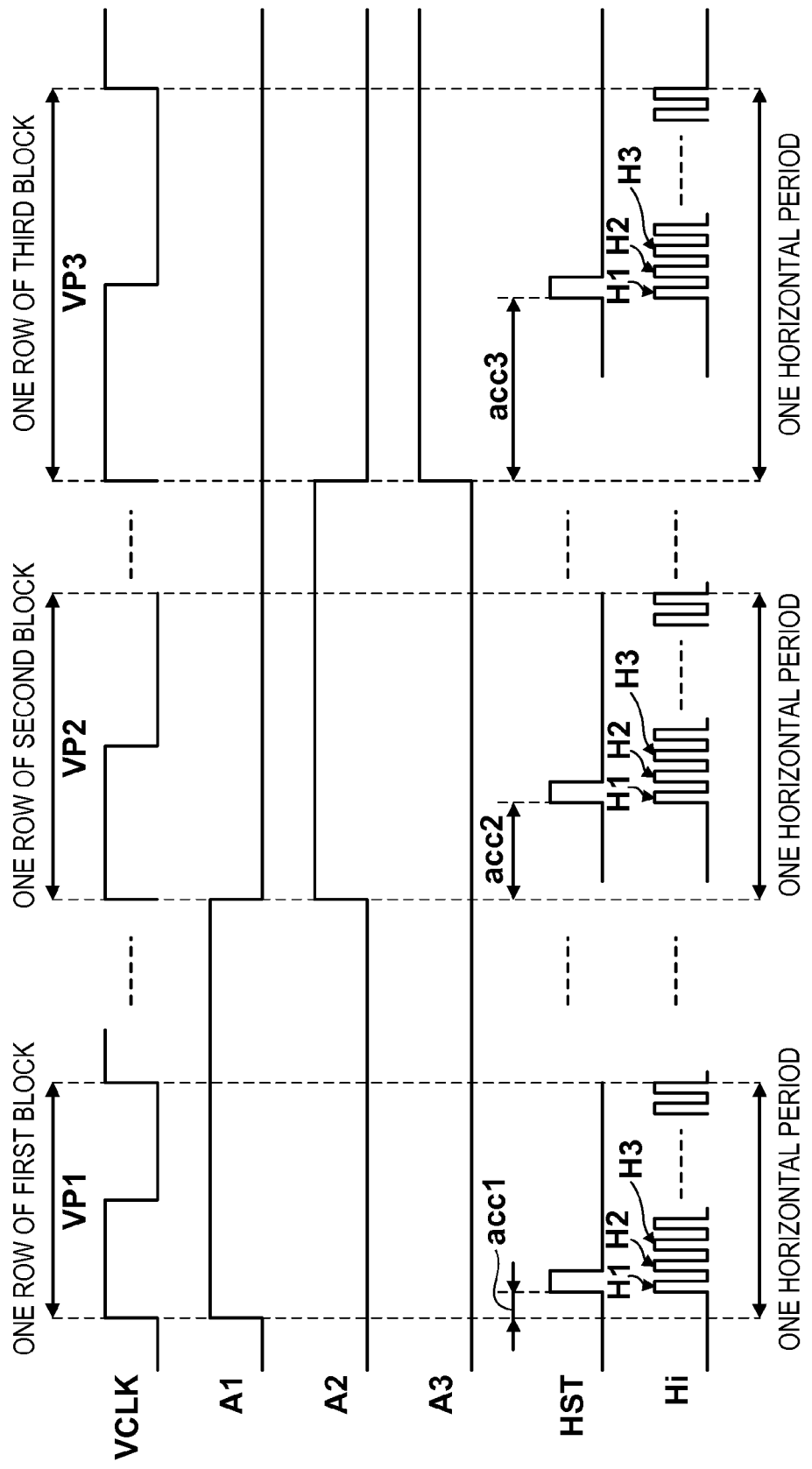
FIG. 5 is a timing chart showing an example of the operation of an image sensor according to one embodiment of the present invention.

FIG. 5 schematically shows an operation method for the image sensor 1. "One row of first block" indicates the operation of reading out a signal from one row of the first block. "One row of second block" indicates the operation of reading out a signal from one row of the second block. "One row of third block" indicates the operation of reading out a signal from one row of the third block.

The vertical shift clock VCLK has the period VP1 when reading out a signal from a row of the first block. The vertical shift clock VCLK has the period VP2 when reading out a signal from a row of the second block. The vertical shift clock VCLK has the period VP3 when reading out a signal from a row of the third block. As described above, the relation of VP1<VP2<VP3 is satisfied so as to read out signals from blocks in longer readout periods as the distances from the output portion 24 increase.

Let acc1 be the time from a leading edge of the vertical shift clock VCLK to the generation of the horizontal-shift start signal HST when reading out a signal from a row of the first block, acc2 be the time from a leading edge of the vertical shift clock VCLK to the generation of the horizontal-shift start signal HST when reading out a signal from a row of the second block, and acc3 be the time from a leading edge of the vertical shift clock VCLK to the generation of the horizontal-shift start signal HST when reading out a signal from a row of the third block. The relation of acc1<acc2<acc3 is satisfied so as to read out signals from blocks in longer readout periods as the distances from the output portion 24 increase.

If the processing circuit 225 has the arrangement shown in FIG. 3, acc1 represents a readout period for the first block; acc2, a readout period for the second block; and acc3, a readout period for the third block. In contrast to this, if the processing circuit 225 has the arrangement shown in FIG. 7, the readout period is from a predetermined time such as a time corresponding to a leading edge of the vertical shift clock VCLK to the time of completion of sampling (that is, the time of transition from an ON state to an OFF state of the switch SW). The switch SW can be controlled to make transition from an ON state to an OFF state in synchronism with, for example, a leading edge of the horizontal-shift start signal HST.

As described above, according to this embodiment, the control portion 30 controls readout periods required by the readout portion 20 to read out signals from a plurality of blocks so as to read out signals from block in longer readout periods as the distances from the output portion 24 increase. This makes it possible to solve the problem of shortages of readout period for blocks distant from the output portion 24 and reduce shading.

Figure 6:
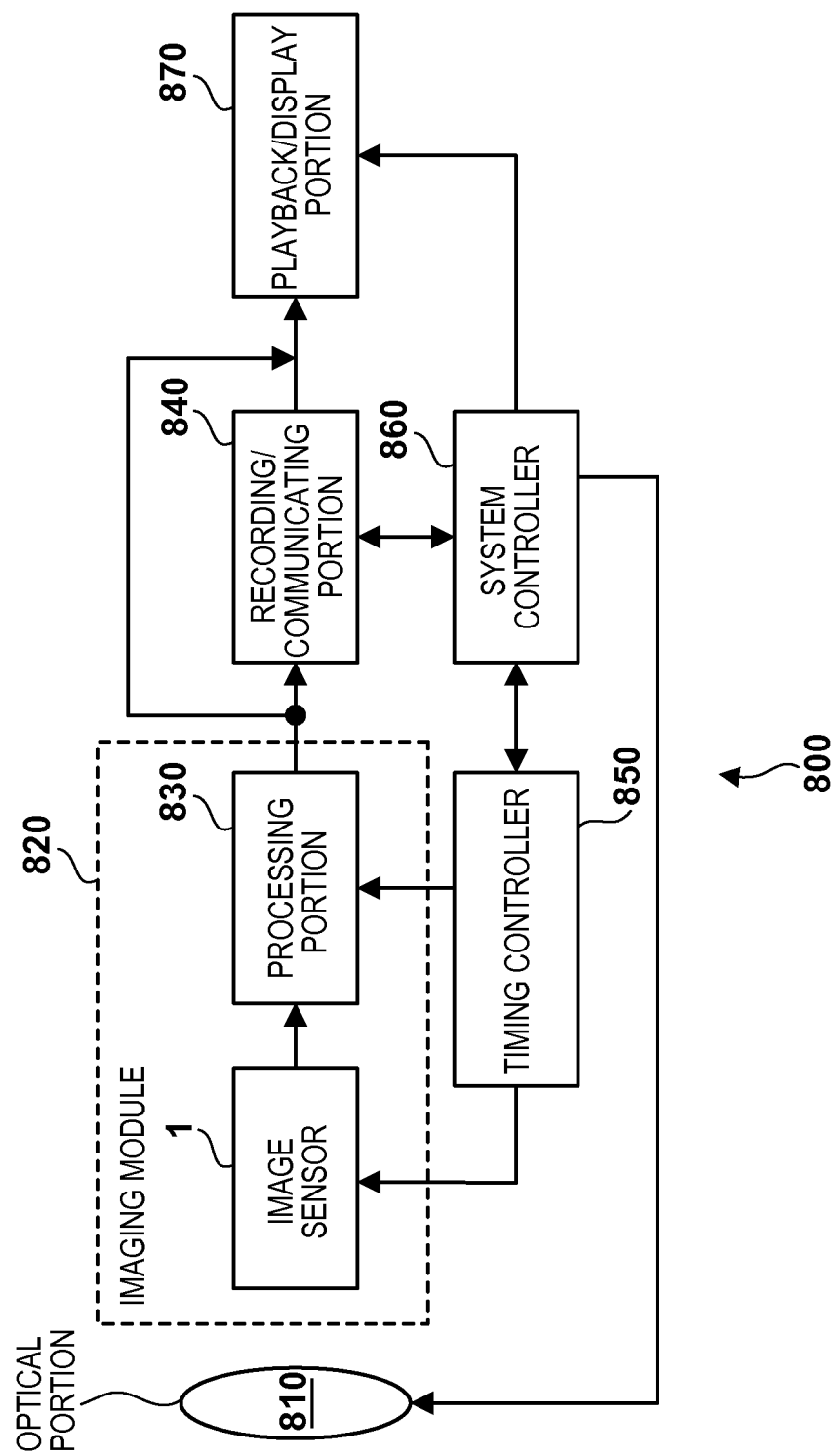
FIG. 6 is a block diagram showing an example of the arrangement of an imaging system according to one embodiment of the present invention.

FIG. 6 shows the arrangement of an imaging system 800 according to one embodiment of the present invention. The imaging system 800 includes, for example, an optical portion 810, an imaging module 820, a recording/communicating portion 840, a timing controller 850, a system controller 860, and a playback/display portion 870. The imaging module 820 can include the image sensor 1 described above and a processing portion 830 which processes the image signal output from the image sensor 1. The processing portion 830 receives an image signal in accordance with the horizontal shift clock HCLK and the horizontal-shift start signal HST output from the image sensor 1 via pads.

The optical portion 810 forms an image of an object on an imaging plane of the image sensor 1. The image sensor 1 operates in accordance with a timing signal from the timing controller 850, and outputs a signal corresponding to the image formed on the imaging plane. The signal output from the image sensor 1 is supplied to the processing portion 830. The processing portion 830 performs signal processing in accordance with the method determined by a program and the like. The signal generated by processing in the processing portion 830 is sent as image data to the recording/communicating portion 840. The recording/communicating portion 840 sends a signal for the formation of an image to the playback/display portion 870. The playback/display portion 870 plays back and displays a moving image and a still image. The recording/communicating portion 840 also receives a signal from the processing portion 830 and communicates with the system controller 860. In addition, the recording/communicating portion 840 records a signal for the formation of an image on a recording medium (not shown).

The system controller 860 comprehensively controls the operation of the imaging system 800, and controls the optical portion 810, the timing controller 850, the recording/communicating portion 840, and the playback/display portion 870. In addition, the system controller 860 can include, for example, a storage device (not shown) as a recording medium. It is possible to record, on the storage device, programs and the like required to control the operation of the imaging system 800. In addition, the system controller 860 supplies, for example, a signal for changing between driving modes in accordance with the operation performed by the user to a corresponding element in the imaging system 800. More specifically, for example, this operation includes changing a row from which readout operation is performed, a row to be reset, and the field angle accompanying electronic zooming and shifting the field angle accompanying electronic anti-vibration operation. The timing controller 850 controls the driving timings of the image sensor 1 and processing portion 830 under the control of the system controller 860.

FIG. 8 shows the arrangement of a multi-chip sensor MCS according to one embodiment of the present invention. The multi-chip sensor MCS is formed from an array of a plurality of image sensors (chips) 1. For example, the multi-chip sensor MCS can be formed from a two-dimensional array of a plurality of image sensors 1. In the case shown in FIG. 8, the plurality of image sensors 1 are arranged to form 2 rows×3 columns. In this case, the direction of the rows (the rows forming the array) of the array of the plurality of image sensors 1 coincides with the direction of the rows of the pixel array 10 of each image sensor 1. In addition, the direction of the columns (the columns forming the array) of the array of the plurality of image sensors 1 coincides with the direction of the columns of the pixel array 10 of each image sensor 1.

In the case shown in FIG. 8, in addition, the plurality of image sensors 1 are arranged such that the column selecting portions 26 sandwich the sensor arrays 10. In other words, on each column of the array of the plurality of image sensors 1, a side, of the two sides of the first image sensor 1 along the row direction, which is located farther from the column selecting portion 26 is close to a side, of the two sides of the second image sensor 1 along the row direction, which is located farther from the column selecting portion 26. This makes it possible to reduce the number of missing pixels in the array of the plurality of image sensors 1.

Figure 9A:
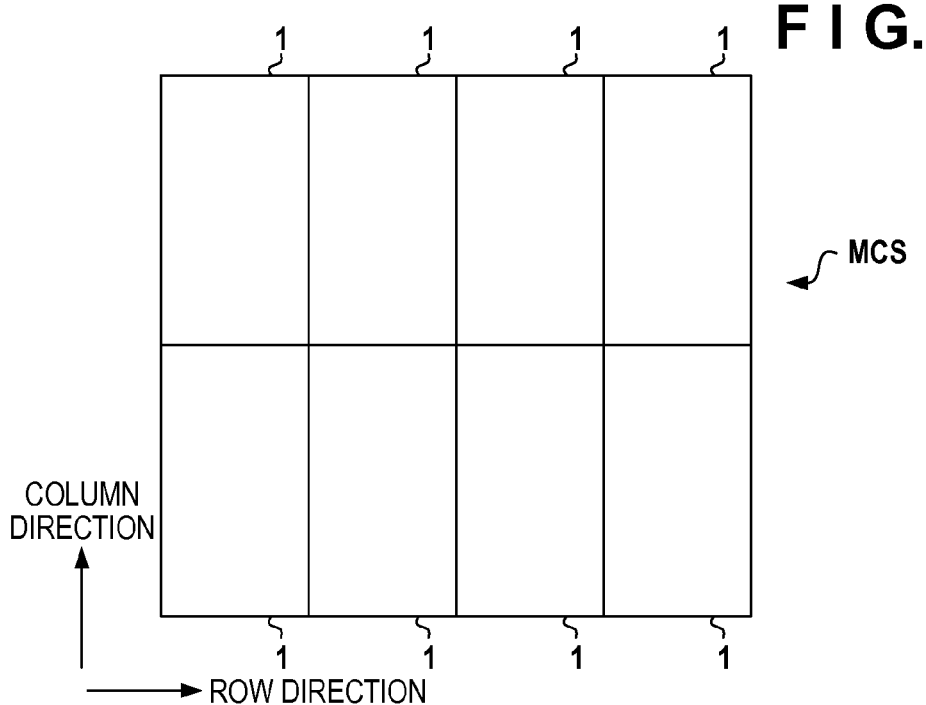
FIGS. 9A and 9B are views showing the arrangement of a multi-chip sensor according to another embodiment of the present invention.
Figure 9B:
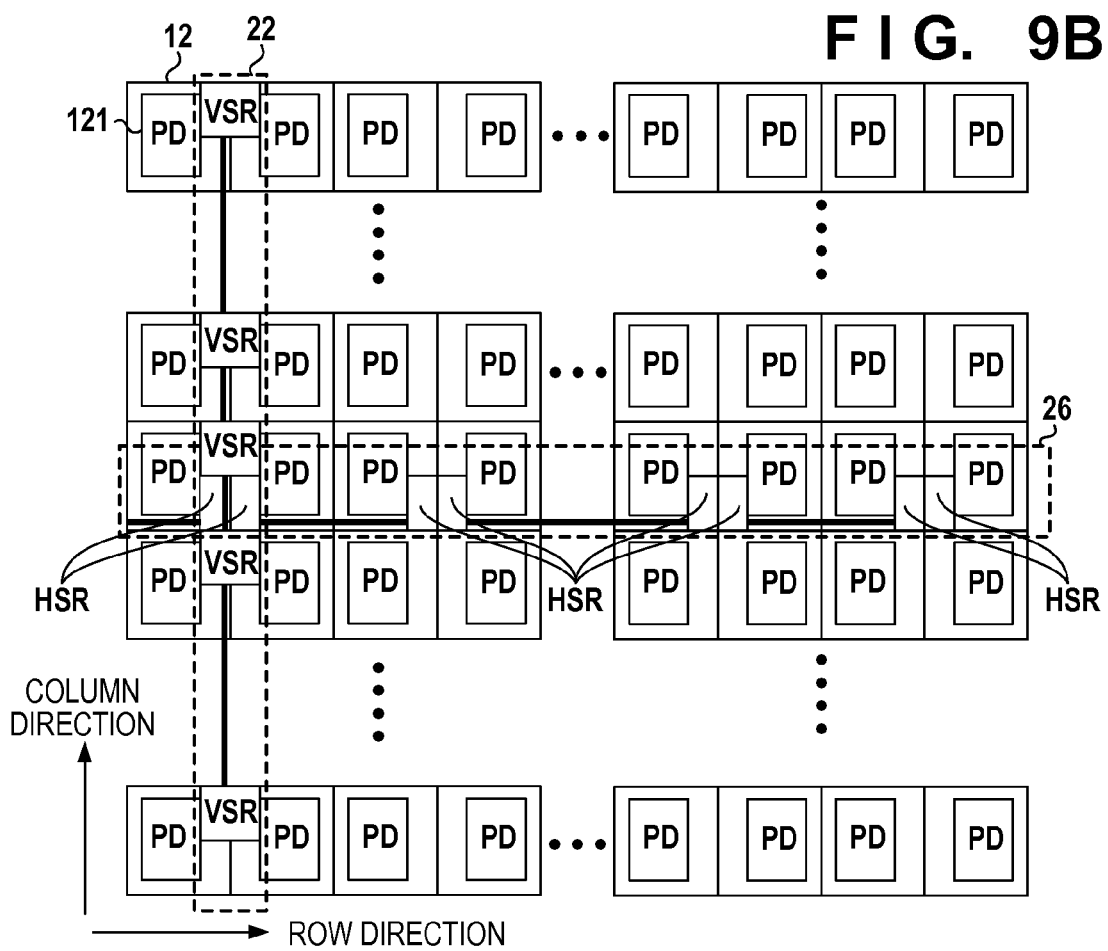

FIG. 9A shows the arrangement of a multi-chip sensor MCS as another embodiment of the present invention. The multi-chip sensor MCS is formed from an array of a plurality of image sensors (chips) 1. FIG. 9B shows an example of the arrangement of the image sensors (chips) 1 forming the multi-chip sensor MCS shown in FIG. 9A. Each image sensor 1 includes pixels 12 arranged so as to form a pixel array of a plurality of rows and a plurality of columns. In the case shown in FIGS. 9A and 9B, the row selecting portion 22 and the column selecting portion 26 are arranged in the pixel array. The row selecting portion 22 is formed from a set of a plurality of constituent elements VSR. Each constituent element VSR is placed between the photoelectric conversion portions 121. In addition, the column selecting portion 26 is formed from a set of a plurality of constituent elements HSR. Each constituent element HSR is placed in the corresponding pixel 12.

In the case shown in FIGS. 8 to 9B, the length of the image sensor 1 in the column direction is larger than the length of the image sensor 1 in the row direction. For example, the length of the image sensor 1 in the column direction is 15 cm, and the length of the image sensor 1 in the row direction is 2 cm. In this arrangement in which the length of the image sensor 1 in the column direction is larger than the length of the image sensor 1 in the row direction, a longer readout period should be assigned to a row located far from the column selecting portion 26 than a row located near the column selection portion 26.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140196, filed Jul. 3, 2013, and No. 2014-102732, filed May 16, 2014, which are hereby incorporated by reference herein in their entirety.

What is claimed is:

1. An image sensor comprising:
a pixel array in which a plurality of pixels are arranged so as to form a plurality of rows and a plurality of columns;
a readout portion configured to read out a signal from the pixel array; and
a control portion configured to control the readout portion, wherein the readout portion includes
a row selecting portion configured to select a row in the pixel array,
a column selecting portion configured to select a column in the pixel array, and
an output portion configured to output a signal from a pixel, of pixels on a row selected by the row selecting portion, which corresponds to a column selected by the column selecting portion,
wherein the pixel array includes a plurality of blocks differing in distance from the output portion, and
wherein the control portion controls readout periods required by the readout portion to read out signals from the plurality of blocks so as to read out signals from blocks in longer readout periods as distances from the output portion increase.

2. The sensor according to claim 1, wherein the output portion includes a horizontal signal line and a plurality of switches configured to output a signal from a pixel, of pixels on a row selected by the row selecting portion, which corresponds to a column selected by the column selecting portion to the horizontal signal line.

3. The sensor according to claim 1, wherein the control portion controls the row selecting portion so as to increase a row selection time taken by the row selecting portion for a block with an increase in distance from the output portion.

4. The sensor according to claim 1, wherein the row selecting portion includes a vertical shift register configured to shift a vertical shift pulse in accordance with a vertical shift clock and selects a row corresponding to a position of the vertical shift pulse, and
the control portion increases a period of the vertical shift clock when the row selecting portion selects a row of a block with an increase in distance from the output portion.

5. The sensor according to claim 4, wherein a supply source for the vertical shift clock is placed nearer to a first-stage register of the vertical shift register than a last-stage register of the vertical shift register.

6. The sensor according to claim 1, wherein the control portion controls the column selecting portion so as to increase a length of time from the selection of a row by the row selecting portion to the beginning of an output by the output portion from a first pixel of the row for a block with an increase in distance from the output portion.

7. The sensor according to claim 1, wherein the column selecting portion includes a horizontal shift register configured to start shifting a horizontal shift pulse in accordance with a horizontal shift clock in response to a horizontal-shift start signal generated by the control portion and selects a column corresponding to a position of the horizontal shift pulse, and
the control portion increases a time from selection of a row by the row selecting portion to generation of the horizontal-shift start signal when the row selecting portion selects a row of a block with an increase in distance from the output portion.

8. The sensor according to claim 1, wherein the control portion includes a vertical control portion and a horizontal control portion,
the vertical control portion includes a plurality of clock generators configured to generate clocks of periods corresponding to corresponding blocks of the plurality of blocks, and supplies a clock generated by a clock generator, of the plurality of clock generators, which corresponds to a block belonging to a row selected by the row selecting portion as a vertical shift clock to the row selecting portion,
the horizontal control portion includes a plurality of timing signal generators configured to generate signals corresponding to corresponding blocks of the plurality of blocks, and supplies a timing signal generated by a timing signal generator, of the plurality of timing signal generators, which corresponds to a block belonging to a row selected by the row selecting portion as a horizontal-shift start signal to the column selecting portion,
the row selecting portion includes a vertical shift register configured to shift a vertical shift pulse in accordance with the vertical shift clock and selects a row corresponding to a position of the vertical shift pulse, and
the column selecting portion includes a horizontal shift register configured to start shifting a horizontal shift pulse in accordance with a horizontal shift clock in response to the horizontal-shift start signal and selects a column corresponding to a position of the horizontal shift pulse.

9. The sensor according to claim 8, wherein each of the plurality of clock generators includes a frequency dividing circuit.

10. The sensor according to claim 8, wherein each of the plurality of timing signal generators includes a counter configured to start counting operation in response to the vertical shift clock.

11. The sensor according to claim 8, further comprising pads configured to respectively output the horizontal-shift start signal and the horizontal shift clock.

12. The sensor according to claim 1, wherein each of the plurality of blocks includes at least one row.

13. The sensor according to claim 1, wherein the output portion includes a sample/hold circuit configured to sample/hold a signal from a pixel, of pixels on a row selected by the row selecting portion, which is included in a column selected by the column selecting portion, and the readout period is a time from a predetermined time to a time of completion of sampling by the sample/hold circuit.

14. An imaging system comprising:
an image sensor defined in claim 1; and
a processing portion configured to process a signal output from the image sensor.

15. A sensor comprising an array of a plurality of image sensors defined in claim 1.

16. The sensor according to claim 15, wherein each of the plurality of image sensors has a larger length in a column direction than in a row direction.

17. The sensor according to claim 15, wherein on each column of the array of the plurality of image sensors, a side, of two sides of the first image sensor along the row direction, which is farther from the column selecting portion of the first image sensor is close to a side, of two sides of the second image sensor along the row direction, which is farther from the column selecting portion of the second image sensor.

18. An operation method for an image sensor including a pixel array in which a plurality of pixels are arranged so as to form a plurality of rows and a plurality of columns and a readout portion configured to read out a signal from the pixel array, wherein the readout portion includes a row selecting portion configured to select a row in the pixel array, a column selecting portion configured to select a column in the pixel array, and an output portion configured to output a signal from a pixel, of pixels on a row selected by the row selecting portion, which corresponds to a column selected by the column selecting portion, the pixel array includes a plurality of blocks differing in distance from the output portion, and wherein the operation method comprises controlling readout periods required by the readout portion to read out signals from the plurality of blocks so as to read out signals from blocks in longer readout periods as distances from the output portion increase.

* * * * *